Patented Apr. 15, 1952

2,592,531

UNITED STATES PATENT OFFICE 2,592,531

FORMYLATING TOCOPHEROL MATERIAL

James G. Baxter, Rochester, N. Y., assignor, by mesne assignments, to Eastman Kodak Company, Rochester, N. Y., a corporation of New Jersey No Drawing. Application October 27, 1949, Serial No. 123,989

15 Claims. (Cl. 260—333)

This invention relates to vitamin E and is particularly concerned with the treatment of tocopherol material normally possessing relatively low vitamin E activity.

The group of vitamin E-active materials known as tocopherols are characterized by a chroman-like heterocyclic ring structure including a benzenoid nucleus. All known tocopherols having a phenolic hydroxyl group substituent in the 6 position on the benzenoid nucleus.

Four naturally-occurring tocopherols have been found and designated respectively as alpha-tocopherol, beta-tocopherol, gamma-tocopherol and delta-tocopherol. The tocopherols occur widely in nature particularly in vegetable oils such as soybean oil, wheat germ oil, cottonseed oil, corn oil, peanut oil and the like. The tocopherols are usually present in vegetable oils as mixtures of two or more of such naturally-occurring tocopherols.

All four of the known naturally-occurring tocopherols exhibit vitamin E biological activity as measured by bioassay methods. Alpha-tocopherol exhibits a high degree of vitamin E activity, while beta-, gamma- and delta-tocopherols have relatively low potency as compared to alpha-tocopherol. The higher potency of alpha-tocopherol is evident whether the tocopherol is in the free or esterified form, tocopheryl esters being readily prepared by known esterification methods as for example by treatment of the free tocopherols with an acid halide or anhydride.

The relatively low potency tocopherols are characterized by having at least one aromatic hydrogen atom on the benzenoid nucleus. In the case of beta-, gamma- and delta-tocopherol, they are characterized by having such aromatic hydrogen atom or atoms ortho to the phenolic hydroxyl atom in the 6 position on the nucleus. The respective structures of these latter three tocopherols are graphically illustrated as follows:

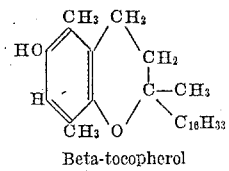
Beta-tocopherol

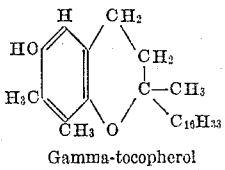
Gamma-tocopherol

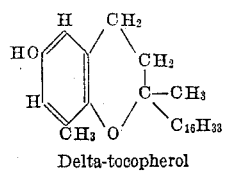
Delta-tocopherol

The relatively low potency tocopherols having at least one aromatic hydrogen atom on the benzenoid nucleus constitute a substantial proportion of the available tocopherol material. It is therefore desirable to enhance the vitamin E biological activity of such relatively low potency material and thereby increase the available supply of highly effective vitamin E.

It is therefore an object of this invention to provide a new and useful method of treating relatively low potency tocopherol material.

It is a further object of the invention to provide a simple method of enhancing the vitamin E biological activity of tocopherol material having at least one aromatic hydrogen atom on the benzenoid nucleus.

Another object of the invention is to convert relatively low potency tocopherol material to biologically active material which is readily convertible to material of substantially enhanced vitamin E biological activity.

Another object of the invention is to provide an economically feasible method of introducing substituent groups on the nucleus of low potency tocopherols without objectionable decomposition or polymerization of the tocopherols being treated.

Another object of the invention is to provide an improved method for introducing methyl groups on the nucleus of tocopherol material normally resistant to direct methylation.

Another object is to convert beta-, gamma- and delta-tocopherols to biologically active derivatives thereof useful as therapeutic agents and readily convertible to alpha-tocopherol in good yield.

Another object is to enhance the vitamin E biological activity of beta-, gamma- and delta-tocopherols.

Another object is to provide an improved method of formylating and methylating beta-, gamma- and delta-tocopherols.

Other objects will be apparent from the description and claims which follow.

These and other objects of the invention are attained by condensing tocopherol material characterized by having at least one aromatic hydrogen atom on the nucleus with hexamethylene tetramine and hydrolyzing the resulting condensation product whereby at least one substituent formyl group is introduced on the nucleus of said tocopherol material in a position normally occupied by an aromatic hydrogen atom. The resulting formylated tocopherol material is biologically active and useful as a therapeutic agent. The substituent formyl groups are readily reduced to methyl groups whereby the vitamin E biological activity of the tocopherol material being treated is substantially enhanced.

This invention is applicable for treating any of the relatively low potency tocopherol materials, whether natural or synthetic, which have at least one aromatic hydrogen atom on the benzenoid nucleus. The processes embodying the invention can be employed for treating low potency tocopherols either singly or in admixture with one or more other low potency tocopherols and/or alpha-tocopherol. The invention is particularly suited for treating beta-, gamma- and delta-tocopherols whether obtained from natural sources such as vegetable oils or prepared synthetically as for example by the condensation of phytol with a methyl-substituted hydroquinone. Treatment of beta-tocopherol in accordance with this invention is especially effective since the conversion of beta-tocopherol to alpha-tocopherol is substantially complete. Substantially complete conversion of beta-tocopherol to alpha-tocopherol is accomplished whether beta-tocopherol is treated in pure form or in admixture with other tocopherols, typical examples being the naturally-occurring mixtures of beta- and alpha-tocopherols in wheat germ oil and the mixtures of beta- and alpha-tocopherols obtained by treatment of a tocopherol composition including delta-tocopherol whereby a portion of such delta-tocopherol is converted to beta-tocopherol and the remainder to alpha-tocopherol.

In commercial practice it is desirable to employ the processes embodying the invention to treat vegetable oil tocopherols which have been obtained from a suitable vegetable oil in the form of a concentrate of tocopherol material. Suitable concentrates are obtained by subjecting a vegetable oil such as cottonseed oil, soybean oil or the like to high vacuum distillation, solvent extraction, saponification, selective adsorption or similar concentrating process or a combination of one or more of the above-mentioned or other concentrating processes. In most cases, the low potency tocopherol material thus obtained is admixed with alpha-tocopherol. The alpha-tocopherol can be separated from such other tocopherol material prior to treatment in accordance with this invention if desired, but such separation is not necessary since alpha-tocopherol is not adversely affected by such treatment.

Non-alpha tocopherols are subjected to formylation in accordance with this invention by condensing such tocopherols with hexamethylene tetramine and hydrolyzing the resulting condensation product whereby formylated tocopherols are obtained. The substituent formyl groups can thereafter be reduced to methyl groups, the process of formylation and reduction resulting in an enhancement of the vitamin E activity of relatively low potency tocopherol material as described in detail in the copending application of Weisler Serial No. 123,986 filed October 27, 1949.

In condensing hexamethylene tetramine with non-alpha tocopherol material, the reaction is preferably carried out in the presence of an acidic condensation catalyst. Any of the well-known acidic condensation catalysts can be employed, the free acids including both inorganic and organic acids being desirably employed. Of the inorganic acids, phosphoric acid is preferably employed although mineral acids such as hydrochloric acid can be used. The organic carboxylic acids are preferably employed as condensation catalysts, such carboxylic acids including both aliphatic and aromatic carboxylic acids. Aliphatic carboxylic acids which are effectively employed include the lower aliphatic acids such as acetic acid and formic acid as well as higher fatty acids such as caprylic and palmitic acids and the like. Aromatic acids which can be employed are exemplified by benzoic acid and p-toluene sulfonic acid.

The condensation reaction is desirably carried out under substantially water-free conditions or in the absence of substantial amounts of water which would otherwise cause decomposition of the hexamethylene tetramine. Amounts of water up to about 5% of the weight of the hexamethylene tetramine are permissible although the water content is preferably maintained below about 1% by weight. Since water causes decomposition of the hexamethylene tetramine, higher amounts of water are permissible using an excess of the hexamethylene tetramine in the reaction.

The condensation reaction can be carried out by dissolving the tocopherol material being treated and the hexamethylene tetramine directly in the acid catalyst either at room temperature or at elevated temperature. This technique is desirably employed with such acids as formic acid, glacial acetic acid, caprylic acid and the like. Alternatively, the reactants are dissolved in an organic solvent and the reaction effected in solvent medium. Suitable solvents for use in the condensation reaction include the aliphatic alcohols such as ethanol, butanol and the like, mixed alcohol-ethers such as 2-ethoxyethanol, ethylene glycol monomethyl ether, 2-butoxyethanol and the like, esters such as butyl acetate and ethyl acetate, ketones such as acetone and methylethyl ketone, and similar well-known organic solvents.

The condensation reaction can be effected at room temperature but is desirably effected at elevated temperatures to shorten the reaction period, reaction readily being effected at reflux temperatures of the solvent vehicle. The condensation reaction proceeds by addition to the tocopherol material in the positions normally occupied by aromatic hydrogen atoms.

The resulting condensation product is then hydrolyzed to give formylated tocopherol material having substituent formyl groups in the positions normally occupied by aromatic hydrogen atoms. Hydrolysis is effected in the usual manner by treating the condensation product with water, preferably in the presence of hydrogen ions as by hydrolysis with aqueous mineral acids such as hydrochloric acid, sulfuric acid and the like.

The resulting formylated tocopherol material exhibits biological activity and is useful as a therapeutic agent in the treatment of muscular degenerative diseases such as muscular dystrophy and the like. The formylated tocopherol material is desirably used as a therapeutic agent in esterified form. Both free and formylated tocopherols are readily esterified by treatment with acid halides or anhydrides. The acyl esters and particularly the fatty acid esters are desirably prepared, esters of fatty acids having not more than about 20 carbon atoms being preferred. Thus esterification can be effected using anhydrides such as acetic anhydride or acyl halides such as benzoyl chloride, palmityl chloride and the like to prepare tocopheryl esters such as the acetates, benzoates, palmitates, myristates, stearates and the like.

The formylated tocopherol material can thereafter be subjected to reduction to reduce the substituent formyl groups to methyl groups. In the formylation of beta-tocopherol in accordance with this invention, 7-formyl beta-tocopherol is produced which upon reduction gives alpha-tocopherol of substantially greater vitamin E biological activity than the original beta-tocopherol. Formylation of gamma-tocopherol gives the biologically active 5 - formyl gamma - tocopherol which is also reduced to alpha-tocopherol. Formylation of delta-tocopherol in accordance with this invention usually results in a mixture of 5-, formyl delta-tocopherol and 5,7-formyl delta-tocopherol which are reduced to beta-tocopherol and alpha-tocopherol respectively. The condensation and hydrolysis followed by reduction thus serves to enhance the vitamin E biological activity of relatively low potency tocopherol material.

Reduction of the substituent formyl groups introduced on the nucleus of relatively low potency tocopherol material by means of this invention is accomplished by treatment of the formylated material with an active metal, such as zinc, and a mineral acid such as hydrochloric acid; by treatment with a zinc-mercury amalgam and a mineral acid in accordance with the Clemmensen procedure; by catalytic hydrogenation at elevated pressures in the presence of a metal catalyst such as nickel or palladium; by treatment with a reducing metal hydride such as lithium aluminohydride, lithium borohydride or aluminum hydride followed by hydroylsis and treatment with zinc and mineral acid, or by other reduction process effective to reduce formyl groups to methyl groups. Such reduction processes are effective for treating both free and esterified formyl tocopherol derivatives to give alpha-tocopherol or alpha-tocopheryl esters.

The invention is further illustrated by the following examples of preferred embodiments thereof.

*Example 1*

The treatment of beta-tocopherol in accordance with the invention is illustrated by the following detailed example wherein a mixture of beta-tocopherol and alpha-tocopherol was treated to formylate the beta-tocopherol. Two hundred kilograms of a mixed tocopherol concentrate containing 44% total tocopherol by Emmerie-Engel assay in the ratio of about 30 parts by weight of beta-tocopherol and about 70 parts by weight of alpha-tocopherol and 6 kilograms of hexamethylene tetramine were dissolved in 106 gallons of glacial acetic acid. The resulting solution was heated at 100° for 3.5 hours to effect condensation between the beta-tocopherol and the hexamethylene tetramine. Following condensation, a sample of the reaction mixture was poured into water, extracted with ether and the extract was washed with 1 N. potassium hydroxide and with water. After removal of the ether by evaporation, an extract residue was obtained which had an absorption maximum of 286 m$\mu$ as compared to a maximum of 292 m$\mu$ for the original concentrate being treated.

The condensation product remaining in the reaction mixture was thereafter hydrolyzed by adding 24 gallons of hydrochloric acid to the reaction mixture and stirring the mixture maintained at 40° C. for 90 minutes. The hydrolysis converted the initial condensation product to 7-formyl beta-tocopherol. This was verified by extracting the hydrolysis mixture with ether, washing the ether extract to neutrality with water and treating a sample of the extracted 7-formyl beta-tocopherol after removal of the solvent with 2,4-dinitrophenyl hydrazine to give a deep-red precipitate.

*Example 2*

The beta-tocopherol in the concentrate of Example 1 was thereafter enhanced in vitamin E biological potency by dissolving the 7-formyl beta-tocopherol prepared as in Example 1 in 300 gallons of isopropyl ether, adding to the resulting solution 70 kilograms of zinc and 24 gallons of hydrochloric acid, and stirring the mixture for 90 minutes while maintaining it at a temperature of 40° C. The mixture was then diluted with 100 gallons of water, and the isopropyl ether layer containing a concentrate enriched in alpha-tocopherol was separated, washed with water, and the solvent removed by distillation. The overall recovery of tocopherols was 85% of the total tocopherol present in the original concentrate. The conversion of beta-tocopherol to alpha-tocopherol was substantially 100% as indicated by chemical assay according to the method of Quaife (J. Biol. Chem., 175, 605 (1948)).

*Example 3*

A gamma-tocopherol concentrate was treated as in Example 1 using a mixture of glacial acetic and formic acid to catalyze the condensation with hexamethylene tetramine. Hydrolysis of the condensation product was effected using 5% aqueous hydrochloric acid. The resulting 5-formyl gamma-tocopherol gave a deep red precipitate with dinitrophenyl hydrazine solution in ethanol. Reduction of the substituent formyl group in the 5 position to a methyl group was effected by means of the Clemmensen procedure using zinc-mercury amalgam and hydrochloric acid. The conversion of gamma-tocopherol to alpha-tocopherol was about 70%. The presence of alpha-tocopherol was verified by preparing the crystalline acid succinate which melted at 76–77° C.

*Example 4*

A 4.5 g. sample of delta-tocopherol of 94.5% purity and having $$E^{1\%}_{1\,cm.}(298\ m\mu) = 77.5$$

was dissolved in 50 cc. of glacial acetic acid to which was added 1.6 g. of hexamethylene tetramine. The resulting solution was refluxed for 150 minutes, neutralized with 0.5 N. potassium hydroxide, extracted with ether and the extract washed free of base. The condensation product had $$E^{1\%}_{1\,cm.}(278\ m\mu) = 140$$

and $$E^{1\%}_{1\,cm.}(380\ m\mu) = 50$$

The condensation product weighing 4.88 g. was then dissolved in 70 cc. of isopropyl ether and hydrolyzed by the addition thereto of 8 cc. of concentrated hydrochloric acid followed by stirring for 150 minutes at room temperature. The hydrolysis product was extracted with ether, the ether extract was washed to neutrality and the ether removed by evaporation. The formylated delta-tocopherol weighed 5.3 g., gave a red precipitate with 2,4-dinitrophenyl hydrazine and had $$E_{1\,cm.}^{1\%}(280\ m\mu) = 150$$

and $$E_{1\,cm.}^{1\%}(380\ m\mu) = 52$$

*Example 5*

A 1 g. sample of mixed formyl delta-tocopherol derivatives including 5,7-diformyl delta-tocopherol prepared as in the preceding example was dissolved in 25 ml. of dry ether and placed in a three-necked flask equipped with a stirrer and a reflux condenser. Reduction of the substituent formyl groups was effected in the following manner. Four ml. of an 0.8 N. solution of lithium aluminohydride in ether was added dropwise to the reaction solution while the solution was being stirred and the solution was refluxed for 25 minutes. The resulting metal complex was hydrolyzed with 5% hydrochloric acid to give the corresponding 5,7-dihydroxymethyl delta-tocopherol. This intermediate was isolated by ether extraction and evaporation of the ether under nitrogen. It was a reddish-brown oil having $$E_{1\,cm.}^{1\%}(302\ m\mu) = 68.2$$

The reduction of the formyl groups to hydroxymethyl groups was shown by the lack of a precipitate with 2,4-dinitrophenyl hydrazine and the presence of a strong hydroxy band by infra-red analysis. The hydroxymethyl groups were then reduced to methyl groups as follows. Five grams of freshly prepared zinc amalgam, 30 cc. of water, 5 cc. of concentrated hydrochloric acid, and the hydroxymethylated tocopherol dissolved in 30 cc. of petroleum ether were mixed together and 5 cc. of peroxide-free dioxane was added to increase the water solubility of the reaction product. The mixture was refluxed for 22 hours with an additional 1 ml. of concentrated hydrochloric acid being added each hour during the first six hours of the reflux period. The mixture was then cooled, extracted with ether, and the ether extract was washed and dried and the ether removed by evaporation under nitrogen. The resulting concentrate of alpha-tocopherol was chromatographed on sodium aluminum silicate to give a purified alpha-tocopherol concentrate having $$E_{1\,cm.}^{1\%}(292\ m\mu) + 41.4$$

Conversion of the 5,7-diformyl delta-tocopherol to alpha-tocopherol was verified by preparation of the crystalline acid succinate melting at 76–77° C.

*Example 6*

A soybean oil concentrate containing a mixture of alpha-, gamma- and delta-tocopherols in the ratio of about 10:60:30 parts by weight was dissolved in caprylic acid without a solvent and condensed with hexamethylene tetramine according to the procedure in Example 4. The resulting mixture of formylated tocopherols was reduced by equal its weight of zinc dust and hydrochloric acid. The resulting concentrate showed a greatly enhanced vitamin E biological activity by bioassay.

*Example 7*

Gamma-tocopherol was converted to alpha-tocopherol in good yield by the method of Examples 1 and 2 using benzoic acid as condensation catalyst in place of acetic acid and carrying out the condensation in butyl alcohol as the solvent for the gamma-tocopherol and hexamethylene tetramine. Similar results were obtained using phosphoric acid in butyl alcohol in place of the benzoic acid.

This invention thus provides a new and useful method of treating relatively low potency tocopherol material to convert such tocopherol material to a biologically active formyl tocopherol derivative which is readily reduced to material having substantially enhanced vitamin E biological activity.

While the invention has been described in considerable detail with reference to certain preferred embodiments thereof, it will be understood that variations and modifications can be effected within the spirit and scope of the invention as described hereinabove and as defined by the appended claims.

What I claim is:

1. The method of making biologically active material which is convertible by reduction to material of high vitamin E biological activity which comprises reacting hexamethylene tetramine and tocopherol material having at least one aromatic hydrogen atom on the benzenoid nucleus, and hydrolyzing the resulting substituent group in the position of said aromatic hydrogen atom on the nucleus of said tocopherol material to a formyl group.

2. The method of making biologically active material which is convertible by reduction to material of high-vitamin E biological activity which comprises introducing at least one substituent formyl group on the nucleus of a tocopherol compound selected from the class consisting of beta-tocopherol, gamma-tocopherol and delta-tocopherol, said substituent formyl group being introduced in a position normally occupied by an aromatic hydrogen atom by condensing said tocopherol compound with hexamethylene tetramine in the presence of an acidic condensation catalyst and hydrolyzing the product of said condensing.

3. The method of making biologically active material which is convertible by reduction to material of substantially higher vitamin E biological activity which comprises condensing a tocopherol compound having at least one aromatic hydrogen atom on the nucleus and being selected from the class consisting of beta-tocopherol, gamma-tocopherol and delta-tocopherol with hexamethylene tetramine in the presence of an acidic condensation catalyst and in the absence of substantial amounts of water, and hydrolyzing the resulting condensation product, said condensing and hydrolyzing being effective to replace said aromatic hydrogen atom with a formyl group.

4. The method of making biologically active material which is reducible to material having enhanced vitamin E biological activity which comprises introducing at least one substituent formyl group on the nucleus of a tocopherol compound selected from the class consisting of beta-tocopherol, gamma-tocopherol and delta-tocopherol in a position normally occupied by an aromatic hydrogen atom, said introducing being effected by condensing said tocopherol compound with hexamethylene tetramine under substantially water-free conditions and in the presence of free acid, and hydrolyzing the product of said condensing.

5. The method of making a biologically active derivative of delta-tocopherol which comprises replacing at least one of the aromatic hydrogen atoms normally occupying the 5 and 7 positions on the nucleus of delta-tocopherol with a formyl group by condensing delta-tocopherol with hexamethylene tetramine and hydrolyzing the resulting condensation product.

6. The method of making a biologically active gamma-tocopherol derivative which is convertible by reduction to alpha-tocopherol which comprises introducing a substituent formyl group in the 5 position of gamma-tocopherol by condensing gamma-tocopherol with hexamethylene tetramine and hydrolyzing the resulting condensation product.

7. The method of making a biologically active beta-tocopherol derivative which is convertible by reduction to alpha-tocopherol which comprises introducing a substituent formyl group in the 7 position on the nucleus of beta-tocopherol by condensing beta-tocopherol with hexamethylene tetramine and hydrolyzing the resulting condensation product.

8. The method of making a biologically active delta-tocopherol derivative which is convertible by reduction to alpha-tocopherol which comprises introducing substituent formyl groups in the 5 and 7 positions on the nucleus of delta-tocopherol by condensing delta-tocopherol with hexamethylene tetramine and hydrolyzing the resulting condensation product.

9. The method of enhancing the vitamin E biological activity of relatively low potency tocopherol material which comprises condensing hexamethylene tetramine with a tocopherol material normally possessing relatively low vitamin E biological activity and having at least one aromatic hydrogen atom on the benzenoid nucleus and hydrolyzing the resulting condensation product, said condensing and hydrolyzing being effective to replace said aromatic hydrogen atom with a formyl group, and thereafter reducing said formyl group to a methyl group.

10. The method of enhancing the vitamin E biological activity of relatively low potency tocopherol material which comprises condensing a tocopherol compound having at least one aromatic hydrogen atom on the nucleus and being selected from the class consisting of beta-tocopherol, gamma-tocopherol and delta-tocopherol with hexamethylene tetramine in the presence of an acidic condensation catalyst, and hydrolyzing the resulting condensation product, said condensing and hydrolyzing being effective to replace said aromatic hydrogen atom with a substituent formyl group, and thereafter reducing said substituent formyl group to a methyl group.

11. The method of enhancing the vitamin E biological activity of relatively low potency tocopherol material which comprises condensing a tocopherol compound having at least one aromatic hydrogen atom on the nucleus and being selected from the class consisting of beta-tocopherol, gamma-tocopherol and delta-tocopherol with hexamethylene tetramine in the absence of substantial amounts of water and in the presence of an acidic condensation catalyst, hydrolyzing the resulting condensation product and reducing the product of said hydrolyzing, said condensing, hydrolyzing and reducing in combination being effective to replace said aromatic hydrogen atom with a methyl group.

12. The method of treating relatively low potency delta-tocopherol having aromatic hydrogen atoms in the 5 and 7 positions on the nucleus which comprises replacing at least one said aromatic hydrogen atom with a methyl group by condensing delta-tocopherol with hexamethylene tetramine, hydrolyzing the product of said condensing, and reducing the product of said hydrolyzing.

13. The method of enhancing the vitamin E biological activity of gamma-tocopherol which comprises replacing the aromatic hydrogen atom in the 5 position on the nucleus of gamma-tocopherol with a methyl group by condensing gamma-tocopherol with hexamethylene tetramine, hydrolyzing the resulting condensation product, and reducing the product of said hydrolyzing.

14. The method of enhancing the vitamin E biological activity of beta-tocopherol which comprises replacing the aromatic hydrogen atom in the 7 position on the nucleus of beta-tocopherol with a methyl group by condensing beta-tocopherol with hexamethylene tetramine, hydrolyzing the resulting condensation product, and reducing the product of said hydrolyzing.

15. The method of enhancing the vitamin E biological activity of delta-tocopherol which comprises replacing the aromatic hydrogen atoms in the 5 and 7 positions on the nucleus of delta-tocopherol with methyl groups by condensing delta-tocopherol with hexamethylene tetramine, hydrolyzing the resulting condensation product, and reducing the product of said hydrolyzing.

JAMES G. BAXTER.

REFERENCES CITED

The following references are of record in the file of this patent:

Chemical Abstracts 40, 6445 (1946).